2,849,483

METHOD OF PURIFYING AROMATIC DICARBOXYLIC ACIDS

George E. Ham, Decatur, Ala., assignor to The Chemstrand Corporation, Decatur, Ala., a corporation of Delaware No Drawing. Application July 30, 1954
Serial No. 446,963

11 Claims. (Cl. 260—516)

This invention relates to a new method for purifying aromatic dicarboxylic acids. More particularly, the invention is concerned with a new method for purifying aromatic dicarboxylic acids by means of recrystallization solvents, said acids being those which may be employed in the manufacture of fiber-and filament-forming polyesters and copolyesters.

In recent years various aromatic dicarboxylic acids, such as terephthalic acid, p,p'-dicarboxybiphenyl, p,p'-dicarboxythiocarbanilide, etc., have increased considerably in commercial importance in view of the fact that these acids, when in a pure state, are capable of entering into a condensation polymerization reaction with various glycols, such as ethylene glycol, and the like, to form compositions which in turn are capable of being formed into fibers and filaments. The filaments thus produced, are capable of being cold-drawn and have many commercial applications.

In order to form condensation polymerization products or polyesters which are capable of producing fibers and filaments which in turn are capable of being cold-drawn, it has been found that the dibasic acids employed must be in a pure state in order to achieve the sought for desirable properties. However, due to insolubility of most of the dibasic acids in common solvents, it has been difficult to effect purification of the acids by normal recrystallization procedures. For example, terephthalic acid, which is the acid most frequently employed in the desired condensation polymerization reactions, usually contains varying amounts of p-taluic acid, and also isophthalic acid, residual catalyst, and colored oxidation products, which are exceedingly difficult to separate therefrom. From example, the similarity between terephthalic acid and p-toluic acid, with respect to chemical and physical properties, make them difficult to separate by coventional methods. The high boiling points and slight solubility of the two acids make physical separations difficult. Chemical methods of purification of the aromatic dibasic acids which have been employed heretofore have not been entirely satisfactory due principally to economic reasons.

Various procedures which have been proposed for the purification of aromatic dicarboxylic acids suitable for condensation polymerizations to produce fiber- and filament-forming materials, have involved conversion of the acid to an ester and since the esters have a much wider range of solubility, they are much more easily purified than the acids. For example, one method of separating terephthalic acid from isophthalic acid involves forming the alkyl esters of the acids, fractionating the esters and saponifying the ester fractions. Ordinarily the dimethyl esters are used to effect separation in this manner. However, these methods of ester conversion are expensive on a commercial scale because of requirement of stainless steel pressure equipment, low equipment capacity, etc.

Therefore, there has been a great desire in the art to find other means for the purification of aromatic dicarboxylic acids, which are suitable for condensation polymerizations, which methods are simpler in their operation and more beneficial from an economic standpoint.

Accordingly, it is a primary object of the present invention to provide a new method for purifying aromatic dicarboxylic acids which overcomes the difficulties heretofore encountered in employing prior art procedures, said acids being those suitable for condensation polymerizations from the products of which, fibers and filaments can be formed which are capable of being cold-drawn. Other objects and advantages of the instant invention will in part appear and will in part be apparent from the description thereof hereinafter.

It has unexpectedly been found that N-formyl morpholine and N-formyl piperidine are solvents at elevated temperatures for various aromatic dicarboxylic acids useful in condensation polymerizations. It has further been found that these aromatic dicarboxylic acids, defined more specifically hereinafter, can be purified to a highly pure state by recrystallizing them from N-formyl morpholine or N-formyl piperidine. The recrystallization solvents, useful in the practice of the present invention, have the following structural formulas:

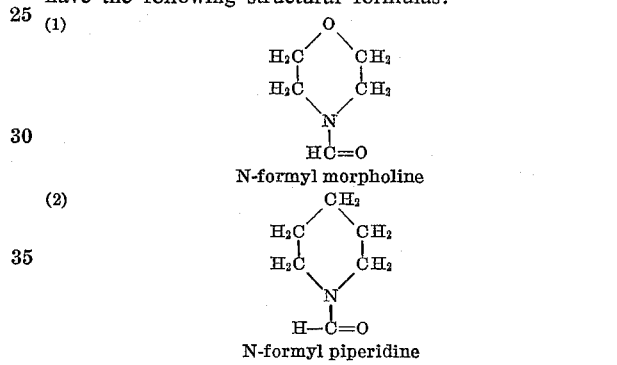

The objects of the present invention are in general accomplished by dissolving the crude aromatic dicarboxylic acid in N-formyl morpholine or N-formyl piperidine at elevated temperatures. Upon cooling the solution the purified aromatic dicarboxylic acid crystals are precipitated. Thereafter the acid is filtered and dried. Of course, normal washing prior to drying of the purified acid with a non-solvent therefor may be employed to remove any recrystallization solvent therefrom.

The aromatic dicarboxylic acids which may be purified in accordance with the present invention are those having the general formula:

wherein $n$ is an integer from zero to one, inclusive, and R is a radical selected from the group of

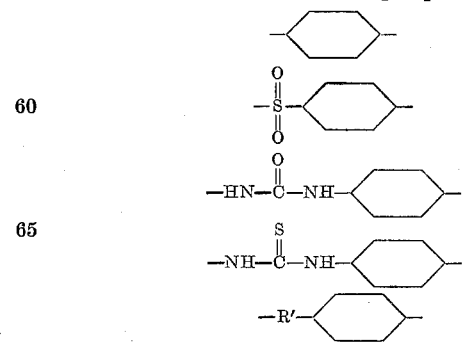

where R' is an alkyl group containing from 1 to 8 carbon atoms;

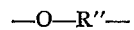

where R″ is an alkyl group containing from one to 6 carbon atoms, and

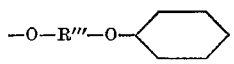

where R‴ is an alkyl group containing from 1 to 6 carbon atoms. As examples of suitable aromatic dibasic acids having the above general formula there may be named:

Terephthalic acid
p,p′-Dicarboxybiphenyl
p,p′-Dicarboxycarbanilide
p,p′-Dicarboxythiocarbanilide
p,p′-Dicarboxydiphenylsulfone
p-Carboxyphenoxyacetic acid
p-Carboxyphenoxypropionic acid
p-Carboxyphenoxybutyric acid
p-Carboxyphenoxyvaleric acid
p-Carboxyphenoxyhexanoic acid
p-Carboxyphenoxyheptanoic acid
p,p′-Dicarboxydiphenylmethane
p,p′-Dicarboxydiphenylethane
p,p′-Dicarboxydiphenylpropane
p,p′-Dicarboxydiphenylbutane
p,p′-Dicarboxydiphenylpentane
p,p′-Dicarboxydiphenylhexane
p,p′-Dicarboxydiphenylheptane
p,p′-Dicarboxydiphenyloctane
p,p′-Dicarboxydiphenoxymethane
p,p′-Dicarboxydiphenoxyethane
p,p′-Dicarboxydiphenoxypropane
p,p′-Dicarboxydiphenoxybutane
p,p′-Dicarboxydiphenoxypentane
p,p′-Dicarboxydiphenoxyhexane The aromatic dicarboxylic acid to be purified is mixed with the selected recrystallization solvent and the mixture is heated until solution occurs. The temperature at which complete solution takes place will depend upon whether N-formyl morpholine or N-formyl piperidine is being employed and upon the particular aromatic dicarboxylic acid being purified. Normally, a temperature within the range of 50° C. to 160° C. is sufficient to bring about complete solution of any of the acids listed hereinbefore. Upon cooling the solution to a temperature in the range of 10° C. to 40° C., the purified aromatic dicarboxylic acid is precipitated and thereafter recovered by filtration. As pointed out hereinbefore, the acid may be washed with a non-solvent therefor prior to drying to remove any recrystallization solvent adhering thereto. Examples of non-solvents are water, methyl alcohol, etc.

Very often the particular aromatic dicarboxylic acid to be purified may contain some existing and undesirable color which must be removed to prevent the color from appearing in the fibers and/or filaments prepared from the polyesters formed from the purified aromatic dicarboxylic acid. The color can easily be removed by employing activated carbon in the recrystallization solvent. Usually from 0.1 to 5 parts by weight of activated carbon, based on the weight of the recrystallization solvent, is sufficient. The activated carbon is added to the hot solution with stirring and thereafter the hot solution is filtered to remove the carbon prior to cooling.

When employing the process of the present invention, the yield obtained is approximately 56 to 99 percent of the weight of the crude or unpurified aromatic dicarboxylic acid, and in those instances, where a product of highest purity is desired, it can be obtained by giving the purified aromatic dicarboxylic acid a second crystallization, and more, if desired.

In order to more clearly understand the process of the instant invention, reference should be had to the following specific examples which are merely intended to be illustrative and not limitative. In the examples, all parts and percents are by weight, unless otherwise indicated.

EXAMPLE I 100 parts of N-formyl morpholine were heated to boiling and 15 parts of crude terephthalic acid were added thereto portionwise to obtain a saturated solution. Upon cooling to a temperature of 25° C., 12 parts of purified terephthalic acid crystallized. The purified acid was filtered and dried. A yield of 80%, based on the weight of the crude acid, was obtained. A further small amount of acid of good purity was obtained by partial evaporation and recooling of the filtrate.

EXAMPLE II 100 parts of N-formyl piperidine were heated to boiling and 8 parts of crude terephthalic acid were added thereto portionwise to obtain a saturated solution. The solution was cooled to a temperature of 25° C. whereupon 4.5 parts of purified terephthalic acid crystallized. The purified acid was filtered and dried. A yield of 56%, based on the weight of the crude acid, was obtained.

EXAMPLE III

A series of runs were made recrystallizing various dicarboxylic acids from N-formyl morpholine and N-formyl piperidine. Pertinent data with respect to these experiments are listed in the following table:

Table

| Acid | Solvent | Parts crude acid/1,000 pts. solvent | Solution temp., ° C. | Recrystallization temp., ° C. | Yield in percent |
|---|---|---|---|---|---|
| p,p′-Dicarboxydiphenoxybutane. | N-formyl morpholine. | 70 | 150 | 25 | 91 |
| p,p′-Dicarboxyphenoxybutane. | N-formyl piperidine. | 55 | 150 | 25 | 91 |
| p,p′-Dicarboxybiphenyl. | N-formyl morpholine. | 10 | 150 | 25 | 99 |
| Do | N-formyl piperidine. | 10 | 150 | 25 | 99 |
| p,p′-Dicarboxydiphenoxyethane. | N-formyl morpholine. | 72 | 150 | 25 | 70.9 |
| Do | N-formyl piperidine. | 59 | 150 | 25 | 68 |
| p-Carboxyphenoxyacetic acid. | N-formyl morpholine. | 550 | 150 | 25 | 67.3 |
| Do | N-formyl piperidine. | 460 | 150 | 25 | 67.4 |

The present invention provides a simple and economic method for purifying the aromatic dicarboxylic acids which are useful in the manufacture of condensation polymerization products. The present method alleviates the difficulties encountered in prior chemical methods of purification. The present method is economical in that conventional equipment can be employed and no special expensive stainless steel pressure equipment is needed as in the case where the acids are converted to esters. After separation of the purified acid, the recrystallization solvent can be recovered by conventional distillation procedures, and the like, and reused, thus reducing the cost of the process. Numerous other advantages of the instant invention will be readily apparent to those skilled in the art.

It is to be understood that changes and variations may be made without departing from the spirit and scope of the invention as defined in the appended claims.

I claim:

1. A process for purifying aromatic dicarboxylic acids having the formula:

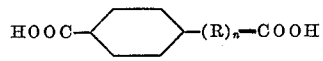

wherein *n* is an integer from zero to one, inclusive, and R is a radical selected from the group consisting of

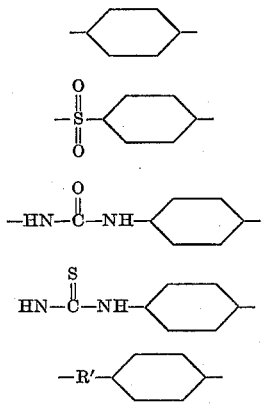

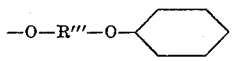

where R' is an alkyl group containing from 1 to 8 carbon atoms; O—R″— where R″ is an alkyl group containing from 1 to 6 carbon atoms; and $$-O-R'''-O-\langle\rangle$$

where R‴ is an alkyl group containing from 1 to 6 carbon atoms, which comprises dissolving the acid in a recrystallization solvent selected from the group consisting of N-formyl morpholine and N-formyl piperidine at a temperature in the range of 50° C. to 160° C., cooling the solution to crystallize the acid, and filtering to remove the purified crystallized dibasic acid.

2. The process as defined in claim 1 wherein from 0.1 to 5 parts of activated carbon are added to the hot solution with stirring and thereafter the hot solution is filtered to remove the carbon prior to cooling said solution.

3. The process as defined in claim 1 wherein the aromatic dicarboxylic acid is terephthalic acid.

4. The process as defined in claim 1 wherein the aromatic dicarboxylic acid is p,p'-dicarboxydiphenoxybutane.

5. The process as defined in claim 1 wherein the aromatic dicarboxylic acid is p,p'-dicarboxydiphenoxyethane.

6. The process as defined in claim 1 wherein the aromatic dicarboxylic acid is p,p'-dicarboxybiphenyl.

7. The process as defined in claim 1 wherein the aromatic dicarboxylic acid is p-carboxyphenoxyacetic acid.

8. The process as defined in claim 1 wherein the recrystallization solvent is N-formyl morpholine.

9. The process as defined in claim 1 wherein the recrystallization solvent is N-formyl piperidine.

10. A process of purifying aromatic dicarboxylic acids having the formula:

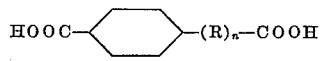

wherein *n* is an integer from zero to one, inclusive, and R is a radical selected from the group consisting of

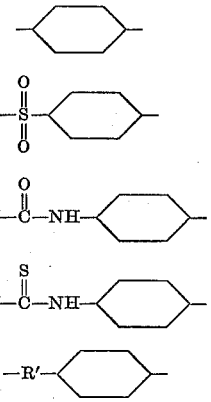

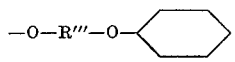

where R' is an alkyl group containing from 1 to 8 carbon atoms; —O—R″— where R″ is an alkyl group containing from 1 to 6 carbon atoms; and $$-O-R'''-O-\langle\rangle$$

where R‴ is an alkyl group containing from 1 to 6 carbon atoms, which comprises dissolving the acid in a recrystallization solvent selected from the group consisting of N-formyl morpholine and N-formyl piperidine at a temperature in the range of 50° C. to 160° C., cooling the solution to a temperature in the range of 10° C. to 40° C. to crystallize the acid, and filtering to remove the purified crystallized dibasic acid.

11. The process as defined in claim 10 wherein from 0.1 to 5 parts of activated carbon are added to the hot solution with stirring and thereafter the hot solution is filtered to remove the carbon prior to cooling said solution.

References Cited in the file of this patent

UNITED STATES PATENTS

| | | |
|---|---|---|
| 2,664,440 | Toland | Dec. 29, 1953 |
| 2,732,399 | Carlston et al. | Jan. 24, 1956 |
| 2,742,496 | Lum et al. | Apr. 17, 1956 |